No. 622,069. Patented Mar. 28, 1899.
J. Y. PAYTON.
FISH HOOK.
(Application filed July 7, 1898.)
(No Model.)
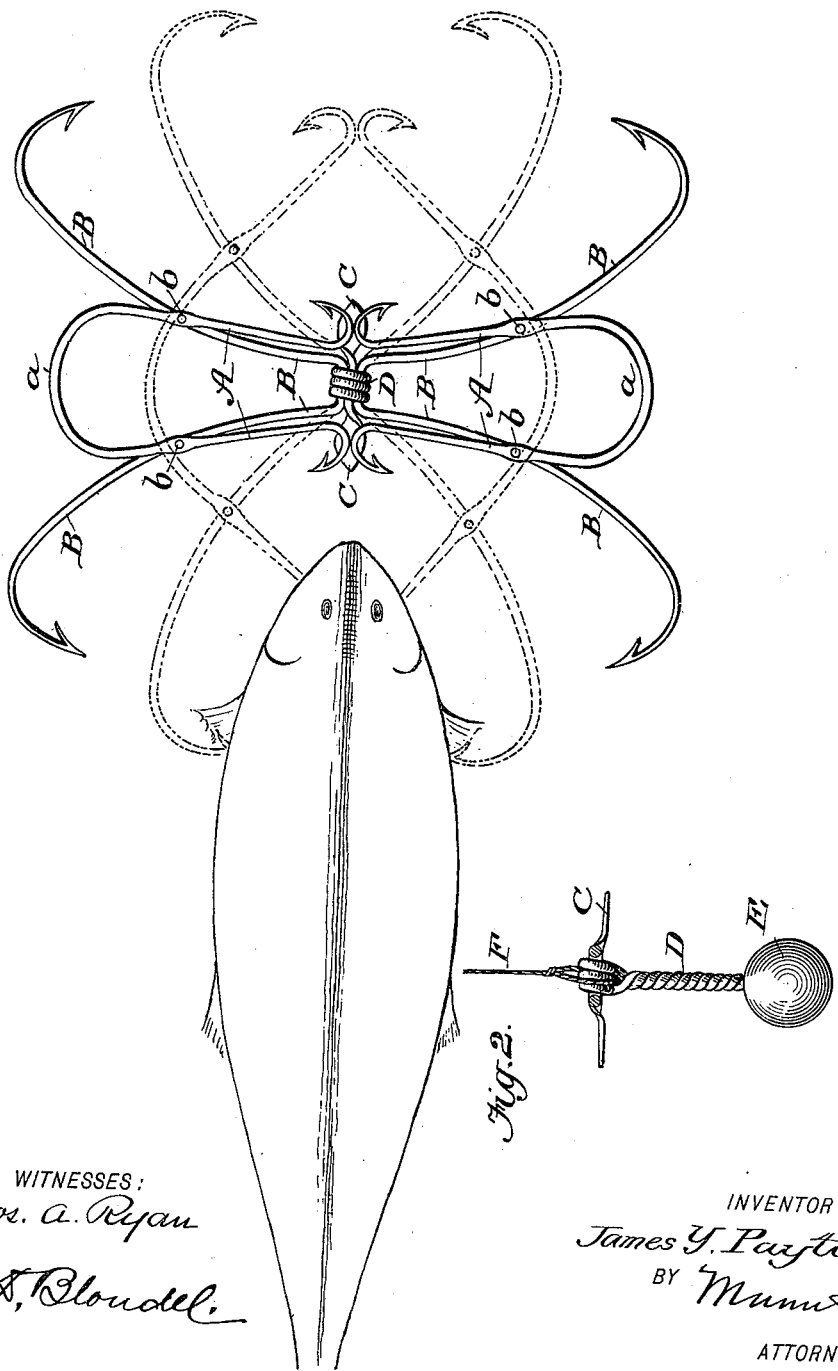
WITNESSES:
Jos. A. Ryan
M. S. Blondel.
INVENTOR
James Y. Payton.
BY Munn & Co.
ATTORNEY.

UNITED STATES PATENT OFFICE.

JAMES Y. PAYTON, OF WALDRON, ARKANSAS, ASSIGNOR OF ONE-HALF TO HUBERT J. HALL, OF SAME PLACE.

FISH-HOOK.

SPECIFICATION forming part of Letters Patent No. 622,069, dated March 28, 1899.

Application filed July 7, 1898. Serial No. 685,334. (No model.)

*To all whom it may concern:*

Be it known that I, JAMES Y. PAYTON, of Waldron, in the county of Scott and State of Arkansas, have invented a new and useful Improvement in Fish-Hooks, of which the following is a specification.

My invention is an improvement in the class of automatic spring-hooks which are adapted to suddenly close and catch the fish when the latter seizes the bait.

The chief characteristic of my invention is the connection and arrangement of bait-hooks and auxiliary or grab-hooks in such manner that by setting the former in a certain position they hold the grab hooks distended and under tension, so that the latter are ready to close upon and pierce the head of the fish when the bait is tampered with. In other words, the two pairs of hooks are held when set in unstable equilibrium, which may be destroyed by traction of a fish on one or both of the bait-hooks.

In the accompanying drawings, Figure 1 is a plan view of my improved fish-hook, showing the same (in full lines) as set for use. Fig. 2 is a detail section of the same.

The two bait-hooks A and two grab-hooks B lie practically in the same horizontal plane, and when the hook is set, as shown by full lines, the curved ends of the bait-hooks A, opposing and pressing against each other, hold the grab-hooks B spread and under tension. When this equilibrium is destroyed, the two sets of hooks change position, as shown by dotted lines.

The details of construction and operation are as follows:

Each bait-hook A is composed of a hook proper, which is formed on the end of a spring-steel rod or wire. Thus each two hooks of a pair are formed of one integral and curved spring-wire, the hooks proper being turned outward or from each other. The grab-hooks B are formed of a similar piece of spring-steel terminating at each end in a hook proper. The two hooks B are clamped firmly at D and pivoted loosely to the bait-hooks A at *b*.

C indicates a short, flattened, twisted, and pointed piece of iron arranged horizontally and symmetrically with relation to both sets of hooks A B.

D represents a piece of soft wire whose central part is coiled tightly one or more times around the central part of hooks B and the intervening bar C, thus forming a rigid clamp, binding them firmly together. The free ends of the wires D are brought together below, twisted on themselves, (extending downward, as shown in Fig. 2,) and attached to a metal ball E. This ball sustains the hooks in a horizontal position and also serves as a sinker. F represents the line attached to the clamp.

The hook is easily set by taking hold of the bait-hooks A at the bends *a* and pulling laterally, so as to separate these points until the bait-hooks are made to abut against each other, as shown. They are thus on a line of unstable equilibrium, as is evident by supposing the abutting hooks A to be pressed a little too far inward, so as to project backward. This backward projection, however, is prevented by the central piece C, on which the hooks rest lightly. Having a quarter-twist, this central piece C presents a forward slope, thus facilitating the forward while offering resistance to a backward projection of the abutting hooks A.

The "set" of the hooks A holds the grab-hooks B distended, as shown by full lines. Tripping is accomplished by breaking the equilibrium of pressure and is easily effected by the fish in three different ways—first, by a slight forward pull or jerk; second, by simply clamping or biting, thus causing a movement of bait-hooks along the forward slope of the twisted central piece C, and, third, by a twist or shake, causing displacement of abutting ends.

The hook's action depends on the tendency of the springs to free themselves from tension when released. Following this tendency the external grab-hooks B simply approach each other, moving through a curve, while the bait-hooks A project forward, preserving their terminal juxtaposition at all points along the line of motion, unless one of them be forcibly obstructed. The forcible obstruction of one, however, in its forward movement has no effect upon its mate, since each hook acts independently of the other by the tension of its own spring.

The dotted lines in Fig. 1 represent the hook in the act of closing in on a fish. It is easy to see that when the abutting hooks are thrown on one side the corresponding hooks on the other side will be thrown at practically the same instant. The simultaneous action of both sides when only one side is disturbed is very advantageous in counteracting rebound of hook. The bait-hooks project forward into the mouth of the fish, thus doubly securing it. This forward movement of the bait-hooks A is a very important feature. The hook is easily tripped, and the rapidity of the action is very great.

What I claim as new, and desire to secure by Letters Patent, is—

1. An automatic spring fish-hook consisting of a pair of hooked and pointed ends restrained in unstable equilibrium in close juxtaposition to each other, and having a range of movement when disturbed by the fish directly outward and down the throat of the fish substantially as shown and described.

2. An automatic spring fish-hook consisting of two pairs of hooked and pointed ends connected by bow-springs, each pair restrained in unstable equilibrium on opposite sides, and with an opposite thrust, and the two points of each pair having a range of movement when disturbed by the fish directly outward in opposite directions, one of the pairs thrusting directly into the mouth of the fish, and the other holding by its recoil the first pair up to its work and thus neutralizing reactionary movement, substantially as and for the purpose described.

3. An automatic fish-hook, comprising spring bait-hooks and spring grab-hooks whose shanks are pivoted together substantially as described, whereby the grab-hooks are held open or distended by abutment of the curved free ends of the bait-hooks as specified.

4. An automatic fish-hook comprising spring grab-hooks and bait-hooks whose shanks are pivoted together, one set lying flat upon the other, and a weight or sinker attached at the central point, substantially as specified.

5. An automatic fish-hook, comprising spring bait and grab hooks, the latter being rigidly connected at their central bends, and their shanks loosely pivoted to the bait-hooks and both sets of hooks being symmetrically arranged as shown and described, whereby when set the bait-hooks abut and hold the grab-hooks distended, and a cross-bar arranged to support the bait-hooks substantially as specified.

6. An automatic fish-hook, comprising two spring grab-hooks, which are connected at their central bends, and two spring bait-hooks, symmetrically arranged with relation to each other and the grab-hooks, whereby, when set, the hooks all lie in practically the same horizontal plane, the bait-hooks holding the grab-hooks distended, and their points projecting outward or in opposite directions, and the opposite points of the grab-hooks projecting inward toward each other, substantially as shown and described.

JAMES Y. PAYTON.

Witnesses:
HENRY L. PRICE,
FRED R. DUNCAN.